May 27, 1958  J. H. DEVINE  2,836,095
SPLIT BOLT WITH PROTRUDING PIVOT PIN TO PROVIDE A STOP SHOULDER
Filed Sept. 28, 1954  2 Sheets-Sheet 1
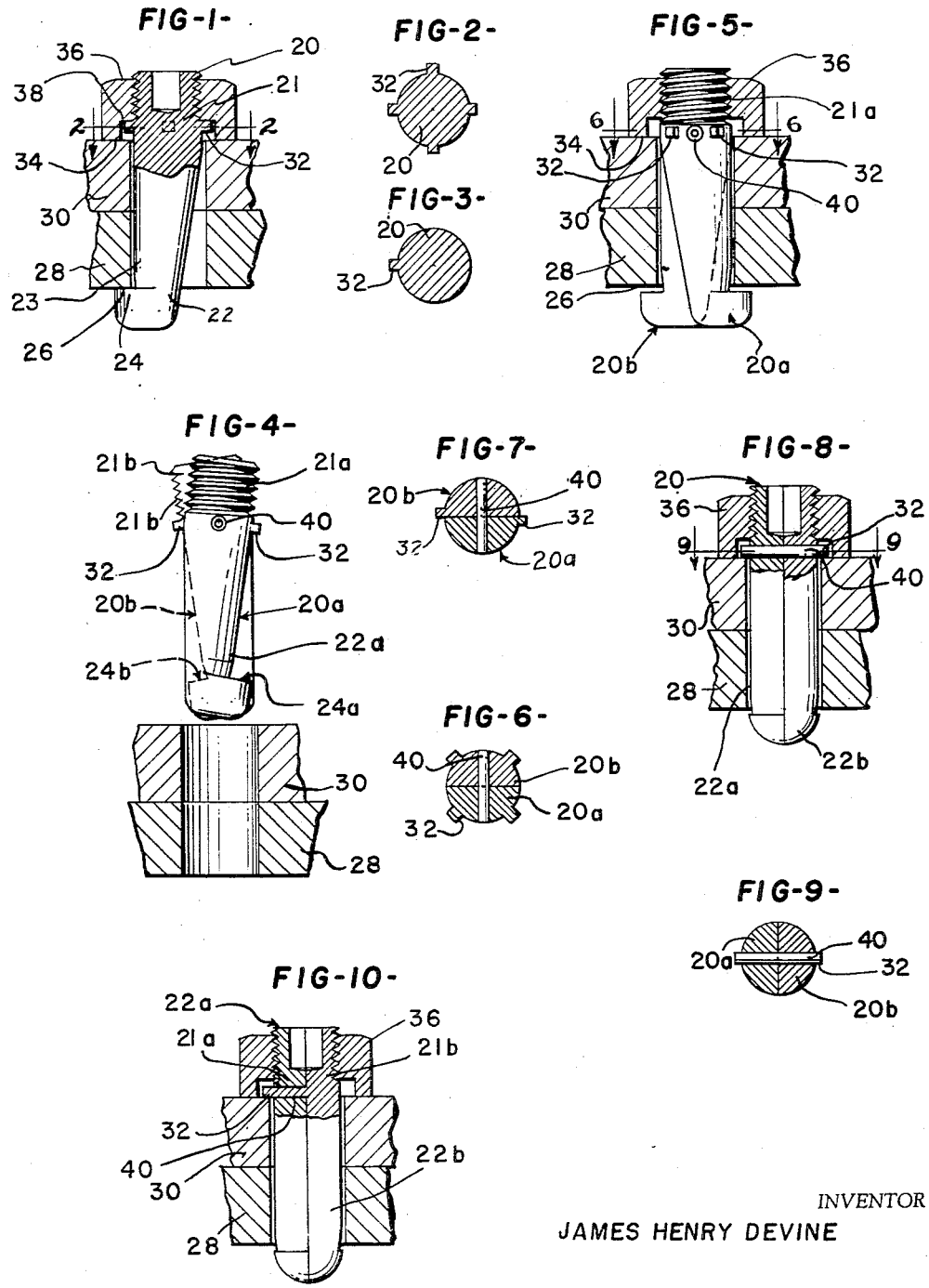
INVENTOR
JAMES HENRY DEVINE
BY
ATTORNEY May 27, 1958  J. H. DEVINE  2,836,095
SPLIT BOLT WITH PROTRUDING PIVOT PIN TO PROVIDE A STOP SHOULDER
Filed Sept. 28, 1954  2 Sheets-Sheet 2
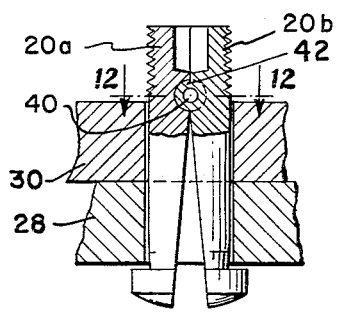
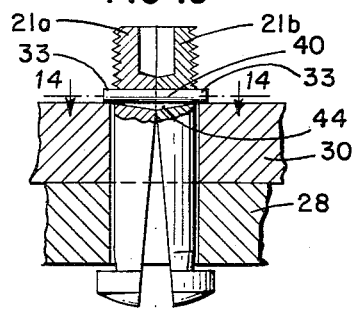
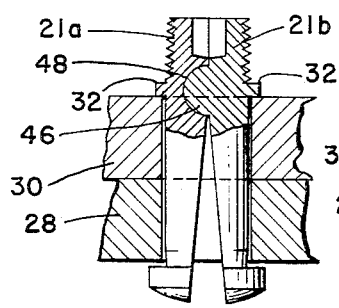
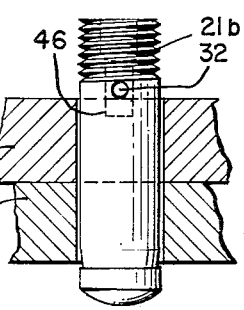
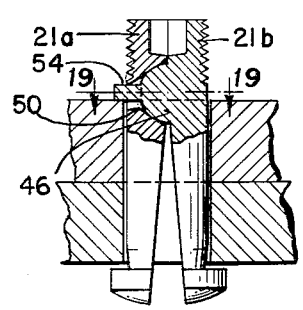
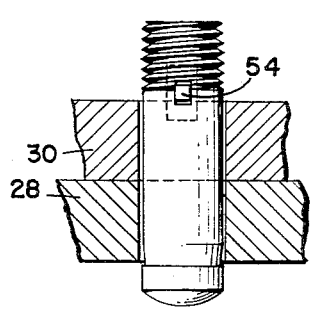
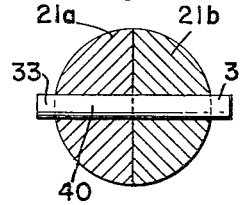
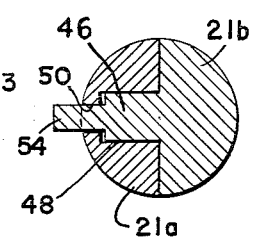
INVENTOR
JAMES HENRY DEVINE
BY
ATTORNEY United States Patent Office 2,836,095
Patented May 27, 1958

2,836,095

SPLIT BOLT WITH PROTRUDING PIVOT PIN TO PROVIDE A STOP SHOULDER

James H. Devine, Washington, D. C.

Application September 28, 1954, Serial No. 458,804

3 Claims. (Cl. 85—1)

This invention relates generally to bolts, and more particularly to blind bolts, that is, bolts that are used to secure, hold, or lock one material, such as a plate, to another when access is not had to one of the bolt-contacting surfaces of one of the plates or materials, such as the back surface of a wall, referred to hereinafter as a "blind surface."

The present invention is an improvement on the inventions disclosed and claimed in my co-pending applications, Serial No. 241,029, filed August 9, 1951, and Serial No. 315,702, filed October 20, 1952, and in my co-pending application, Serial No. 441,214, filed July 6, 1954 now Patent No. 2,804,796.

The bolts described in the first two of the cited applications are of three types: a "solid" bolt, a "slide" bolt, and a "spread" bolt, the solid bolt being made of a single piece of material, the slide bolt of two cooperating component parts pivoted on each other, and the spread bolt of two or more parts pivoted one on each other, to form a unit bolt. In the slide bolt, flat surfaces of the shanks slide one on the other as the bolt parts pivot one on the other to move from a "collapsed" condition (for insertion into holes of plates) to the "expanded" condition (for engaging the blind surface of one of the plates) to lock the plates or materials together. In the spread bolt, the flat surfaces of the shanks spread apart from each other as the parts pivot on each other to move from the collapsed to the expanded condition. Each of the three types of bolts has the common construction characteristic of having at least one member consisting of a tension-producing or threaded portion, defined hereinafter as the "end" of the bolt, and a tapered shank extending axially therefrom, which shank has a flat surface or "toe" extending laterally from the shank to engage a blind surface. When the bolt is inserted in holes in plates in its collapsed condition, it has no engaging "head" as such, but in its expanded condition, the toe or toes form an engaging head. In each of the types of these bolts in said prior inventions, the end of the bolt is larger in diameter than the shank, whereby an overhanging ledge is formed in the plane common to the end and the shank, to contact the outer surface of the exposed plate, referred to hereinafter as the "exposed" surface. The ledge prevents the bolt from passing through the holes in the plates and also forms a pivot on which the parts of the bolt pivot to move from the collapsed condition to the expanded condition. The pivot of the bolt, whether it be only the ledge of the solid bolt or the ledge and a ball or other type of pivot of the slide or spread bolt, is in the plane approximately common to the end and the shank, which plane is referred to hereinafter as the "pivot plane."

The bolts disclosed in the third of the cited applications relate to the same three types of bolts and are characterized further by the shanks being of the same diameter as the threaded ends so that there is no integral ledge formed in the pivot plane of the bolt itself. Also, the shanks are preferably threaded partially along their lengths. These bolts have a groove substantially in the pivot plane in which groove is positioned a protruding ring that engages the rim of the hole in the exposed surface to prevent the bolt from passing through the hole. This ring is capable of being forced into the groove by a nut, as the nut is screwed down over the ring and screwed on along the shank after the nut engages the exposed surface and the bolt is placed under tension.

The present invention provides means, other than the said ledges or rings, for preventing the bolts of my prior inventions from passing through a bolt hole and for providing a pivot upon which the solid bolt or the component parts of the slide or spread bolt pivot on the exposed surface. Examples of such means, as disclosed herein, consist of a protrusion or a plurality of protrusions formed on the surface of the single member of the solid type bolt or on the surfaces of the component parts of the slide or spread types of bolts, or the protrusions may consist of an end or the two ends of the pivot of the bolt, upon which pivot the parts one on the other, the pivot extending beyond the surface of the bolt.

These protrusions are preferably formed on the solid bolt or component parts of the slide or spread bolt at the time that the bolt is made, as for example when made by forging or casting or by a cold flow process. The protrusions are formed substantially in the pivot plane of the bolt and extend from their contiguous surfaces a distance sufficient to engage the rim of the hole in the exposed surface.

As the taper of the shank begins at the pivot plane and as the diameter of the shank at that pivot plane is substantially equal to the diameter of the hole in which the bolt is to be used, only one protrusion per member or part is actually required to keep the solid bolt or the parts of the slide or spread bolt, respectively, from passing through the bolt hole. If only one protrusion is provided, it is preferably located in the axial longitudinal plane of the bolt that passes through the toe on the shank, as the protrusion acts as a pivot for the bolt to change from its collapsed condition to its expanded condition. When the pivot point is in this plane the weight of or the momentum of the bolt as it is inserted in the bolt hole will tend to move the bolt from its collapsed condition to its expanded condition.

The principal object of this invention is to provide, in substantially the pivot plane of a blind bolt of my inventions, means to prevent the bolt from pasisng through the holes in the plates or other materials which are to be bolted together.

Other objects of the invention are to provide, in substantially the pivot plane of a slide or spread bolt of my inventions, a pivot having such dimensions as to extend beyond the normal surface of the bolt (1) to form a protrusion or protrusions to prevent the bolt from passing through the bolt holes, (2) to form a pivot for the parts to pivot one on another, and (3) to form a pivot for the parts to pivot on the exposed surface.

Other objects of the invention will be apparent from the description of the invention as hereinafter set forth in detail and from the drawings made a part thereof, in which:

Figure 1 is a view in cross section of a solid bolt of my invention having four protrusions thereon, the bolt being in position to engage and hold together two plates;

Figure 2 is a view in cross section of the bolt shown in Figure 1, taken on line 2—2;

Figure 3 is a view similar to that of Figure 2, but with the bolt having only one protrusion;

Figure 4 is a view in elevation showing a slide bolt in a collapsed condition, ready to be inserted into a hole in two plates;

Figure 5 is a view in elevation of a slide bolt, having four protrusions thereon, and in its expanded condition and being in position to engage two plates, and with the toes in position to engage the "blind surface," and with a nut shown in cross section;

Figure 6 is a cross section view of the bolt shown in Figure 5, taken on line 6—6;

Figure 7 is a view similar to that of Figure 6, with the bolt having only two protrusions;

Figure 8 is a side elevation of a slide bolt about to engage in tension two plates (shown in cross section), the pivot pin of which bolt extends beyond the surface of the bolt and the ends of the pivot pin engaging the exposed surface of one of the plates;

Figure 9 is a cross section view of the bolt shown in Figure 8, taken on line 9—9;

Figure 10 is a view partly in cross section of a slide bolt in which the pivot is a pin integral with one of the component parts of the bolt, which pin extends beyond the surface of the other part of the bolt, to form a protrusion, the bolt being about to engage in tension two plates;

Figure 11 is a view partly in cross section of a spread bolt of my invention having a pivot in the form of a pin that engages the parts of the bolt in bearings formed in the parts and engages an exposed surface;

Figure 12 is a view partly in cross section of the bolt shown in Figure 11, taken on line 12—12, and showing the pivot pin extending outside the surface of the bolt;

Figure 13 is a view partially in cross section of a spread bolt with its pin pivot extending beyond the surface of the bolt;

Figure 14 is a cross section view of the bolt shown in Figure 13, taken on line 14—14;

Figure 15 is a view partially in cross section of a spread bolt having a pivot consisting of a protuberance on one part engaging a recess in the other part and a protrusion on each of the parts adapted to engage an exposed surface;

Figure 16 is a side elevation view of the right hand part of the bolt shown in Figure 15;

Figure 17 is a view partly in cross section of a spread bolt the pivot of which consists of a protuberance in one part that extends into the other part of the bolt and having a protrusion extending from the protuberance adapted to engage an exposed surface;

Figure 18 is a side elevation view of the left hand part of the bolt shown in Figure 17; and Figure 19 is a view in cross section of the bolt shown in Figure 17, taken on line 19—19.

Referring to Figures 1, 2 and 3, a solid bolt of my invention, shown generally at 20, consists of a threaded end 21 and a tapered shank 22 extending axially therefrom, on which shank is a flat-surfaced toe 24 adapted to engage the blind surface 26 of the plates 28 and 30. In the pivot plane of the bolt are spaced protrusions 32 which are adapted to engage the exposed surface 34 of the plates 30 and 28.

One portion 23 of the shank 22 extends at the pivot plane and lies closely to the side walls of the holes in plates 28 and 30 when the bolt is in its expanded condition, that is, in the position for toe 24 to engage blind surface 26. The other portion of the shank 22 is tapered longitudinally from the pivot plane of the bolt such that the greatest distance in the bolt in the plane of the flat surface of the toe 24 is substantially equal to the diameter of the holes in plates 28 and 30. It will thus be apparent that when the bolt is poised above the holes in plates 28 and 30 with its axis at an angle to the axis of the holes, that is, in its collapsed condition, the bolt can be inserted into the holes until the protrusions 32 projecting from the surface of the bolt come into contact with the exposed surface 34. Upon a protrusion 32 striking the exposed surface 34 the bolt swings from the collapsed condition to the expanded or engaging position with toe 24 opposite blind surface 26.

In Figure 1, a nut 36, with a recess 38 in one end thereof, is shown as screwed down the head 21 with the lower part clearing the protrusions 32 and the lower face of the nut engaging the exposed surface 34. When the nut 36 is screwed down farther, the bolt 20 is lifted until toe 24 engages blind surface 26, and upon further screwing of the nut, the bolt 20 is placed under tension and the plates 28 and 30 are placed under compression.

Referring to Figures 4 to 10, inclusive, each of the slide bolts shown therein consists of two component parts, shown generally at 20a and 20b, pivoted on each other on pin 40, each part with its end 21a or 21b, respectively, its shank 22a or 22b, respectively, each shank with its toe 24a or 24b, respectively, and each part with protrusions 32 thereon substantially in the pivot planes of the parts.

In Figure 4, the bolt is shown in its collapsed condition, poised over holes in plates 28 and 30, ready to be inserted in the holes of plates 28 and 30. In Figure 5, the bolt of Figure 4 is shown in its expanded condition and about to engage plates 28 and 30, with protrusions 32 engaging exposed surface 34 and nut 36 about to engage plate 30.

Referring to Figures 8 and 9, the protrusions 32 are formed by making the pin 40 long enough so as to extend beyond opposite surfaces of the bolt 20.

Referring to Figure 10, the pivot pin 40 is made integral with the part 21b and extends through and beyond part 21a, to form the protrusion 32 only. The bolts shown in Figures 11 to 19, inclusive, illustrate the application of the present invention to the spread type of bolts. The parts of the bolt shown in Figures 11 and 12 pivot on each other on pin 40 that engages journals 42, one in each part 21a and 21b, respectively, the journals 42 fitting into corresponding recesses in its own other component part, as shown particularly in Figure 12.

Referring to Figures 13 and 14, the pin 40 engages the two parts of the bolts in conical shaped holes 44 in the respective parts 21a and 21b, the ends of the pin 40 extending beyond the surface of the bolt to form protrusions 33.

Referring to Figures 15 and 16, the pivot between the parts 21a and 21b consists of a protuberance 46 made integral with part 21b and extending into a corresponding recess 48 in part 21a. Protrusions 32 are formed integral with the respective parts substantially in the pivot plane of the bolt.

Referring to Figures 17, 18 and 19, the pivot between the parts 21a and 21b consists of a protuberance 46 integral with part 21b, which protuberance extends into recess 48 and through hole 50 in part 21a. On the outer surface and integral with protuberance 46 is protrusion or pivot pin 54, substantially in the pivot plane of the bolt.

There is thus disclosed means for preventing a blind bolt, such as disclosed in the applications for patents cited hereinbefore, from passing through holes in the plates or other materials which are to be bolted together.

There is also disclosed means to provide, in substantially the pivot plane of a slide or spread bolt disclosed in the applications for patents cited hereinbefore, a pivot having such dimensions as to extend beyond the normal surface of the bolt (1) to form a protrusion or protrusions to prevent the bolt from passing through the bolt holes, (2) to form a pivot for the parts to pivot one on another, and (3) to form a pivot for the parts to pivot on the exposed surface.

While the preferred embodiments of the invention have been illustrated and described by way of example, it will be obvious that changes may be made therein within the spirit and scope of the invention and, therefore, the invention is not limited to the precise forms herein disclosed.

I claim:

1. A bolt for engaging an exposed surface and a blind surface and having a pair of component parts, each part having a threaded end and a tapered shank extending axially from said end, each of said shanks having a laterally extending toe adapted to engage said blind surface, and a pivot pin engaging said parts substantially in the plane common to said ends and said shanks and having at least one of its ends extending beyond said parts, whereby said bolt engages the rim of a hole in said exposed surface and is prevented from passing through said hole.

2. The combination set forth in claim 1 and further characterized by both ends of said pivot pin extending beyond said parts.

3. The combination set forth in claim 1 and further characterized by the said pin being formed on the inner surface of one of said parts and extending from said part loosely through and beyond the surface of the other of said parts.

References Cited in the file of this patent

UNITED STATES PATENTS

| | | |
|---|---|---|
| 1,055,330 | Kling | Mar. 11, 1913 |
| 1,065,266 | Ogden | June 17, 1913 |
| 1,075,980 | Kling | Oct. 14, 1913 |

FOREIGN PATENTS

| | | |
|---|---|---|
| 175,707 | Great Britain | Mar. 2, 1922 |